(12) United States Patent
Minagawa

(10) Patent No.: US 6,412,737 B1
(45) Date of Patent: Jul. 2, 2002

(54) SUPPORT STAND

(75) Inventor: Yoichi Minagawa, Tokyo (JP)

(73) Assignee: Moridaira Musical Instruments, Chiyoda-ku (JP)

( * ) Notice: Subject to any disclaimer, the term of this patent is extended or adjusted under 35 U.S.C. 154(b) by 0 days.

(21) Appl. No.: 09/827,939

(22) Filed: Apr. 9, 2001

(51) Int. Cl.$^7$ .......................... F16M 11/08; F16M 11/38
(52) U.S. Cl. .................... 248/166; 248/161; 248/125.8; 403/104; 403/109.1; 403/109.3; 403/109.8; 403/377
(58) Field of Search .............................. 248/125.8, 404, 248/414, 166, 159, 170, 176.1, 176.3; 403/109.1, 109.3, 109.8, 377; 192/81 C; 74/522, 521, 531; 188/67

(56) References Cited

U.S. PATENT DOCUMENTS

| | | | | | |
|---|---|---|---|---|---|
| 3,603,623 | A | * | 9/1971 | Widman | 403/104 |
| 3,843,271 | A | * | 10/1974 | Bjerknes | 403/104 |
| 4,243,253 | A | * | 1/1981 | Rogers, Jr. | 285/45 |
| 6,179,514 | B1 | * | 1/2001 | Cheng | 403/377 |
| 6,193,433 | B1 | * | 2/2001 | Gutierrez et al. | 403/325 |
| 6,308,969 | B1 | * | 10/2001 | Young | 280/79.7 |

FOREIGN PATENT DOCUMENTS

JP     A 8-312886     11/1996

* cited by examiner

Primary Examiner—Leslie A. Braun
Assistant Examiner—Deborah M. Brann
(74) Attorney, Agent, or Firm—Oliff & Berridge, PLC

(57) ABSTRACT

A support stand includes a locking unit for adjusting its height and a support unit for angular adjustment in a horizontal plane. The locking unit includes a center bar fixed to the lower end of an outer pipe, a mesh sleeve unit having a mesh sleeve, upper and lower sliding bushes respectively connected to the mesh sleeve, a coil spring arranged between the upper and lower sliding bushes, a spacer sleeve arranged above the upper sliding bush and loosely fitted on the center bar and in the inner pipe whose lower end is fixed to the lower sliding bush, and an actuator sleeve provided around the inner pipe and connected to the inner pipe in a manner movable with the aid of a cross pin passing through axially elongated apertures formed in the inner pipe.

10 Claims, 6 Drawing Sheets

SUPPORT STAND

FIELD OF THE INVENTION

This invention relates to a support stand including a base, three legs secured to the base to extend radially therefrom and substantially equiangularly spaced from one another around the base and having a level adjusting mechanism, an outer pipe vertically extending from the base, an inner pipe telescopically movable in its axial direction relative to the outer pipe for adjusting the height of the support stand, locking means for locking the inner pipe against its telescopic movement relative to the outer pipe, and support means enabling the top of the inner pipe to mount thereon an article to be supported and having a mechanism for adjusting directions of the article in a horizontal plane.

BACKGROUND OF THE INVENTION

There have been microphone stands, tripods for cameras or video cameras and the like as such a support stand mentioned in the first paragraph. In a microphone stand hitherto used, legs are connected to its base by screw threaded connection means to keep the legs at certain angles relative to the base. In another type of the microphone stand, a link mechanism is used for the purpose of extending and collapsing legs of the stand. In a further case, in order to adjust the height of a stand, after loosening a clamping sleeve, outer and inner pipes are adjusted in length by telescopically moving these pipes and then the clamping sleeve is again clamped to complete the adjustment of the height. In the other case, in order to adjust angles of a microphone in a horizontal plane, after loosening clamping screws for a holder attachment for supporting the microphone, the attachment is angularly adjusted in the horizontal plane and then fixed at the adjusted position by tightening the clamping screws.

With the support stands of the prior art, however, when the support stand is located on a floor partly different in height, it is impossible to set vertically a post consisting of an outer and an inner pipe, with the result that the stand becomes unstable tending to fall down. With the support stands of the prior art, moreover, for the purpose of adjusting their height by telescopically moving pipes constituting their post and adjusting their angles in horizontal planes, it is needed to loosen and then again tightening their clamping sleeves and clamping screws.

As can be seen from the above description, the support stands of the prior art suffer disadvantages from the difficulties in adjustment of verticality, height and angle in a horizontal plane and in holding an article to be supported in desired positions.

SUMMARY OF THE INVENTION

It is an object of the invention to provide an improved support stand which eliminates all the disadvantages of the prior art and which is able to adjust an article to be supported in height and angle in a horizontal plane in a simple manner and to hold the thus adjusted article in stable condition.

In order to accomplish the above object, locking means of the support stand according to the invention comprises a center bar concentrically arranged in said outer pipe and its lower end fixed to the lower end of said outer pipe; mesh sleeve means including a mesh sleeve slidably fitted about said center bar, upper and lower sliding bushes connected to upper and lower ends of said mesh sleeve, respectively, a coil spring arranged about said mesh sleeve between said upper and lower sliding bushes so that said mesh sleeve is axially elongated and radially contracted by the spring action of said coil spring to grasp said center bar by means of the mesh sleeve which is contracted and in close contact with said center bar, said lower sliding sleeve being fixed to the lower end of said inner pipe; a spacer sleeve arranged above said upper sliding bush and loosely fitted on said center bar and in said inner pipe; and an actuator sleeve provided around said inner pipe in the proximity of its upper end and connected to said inner pipe in a manner axially movable within a limited range with the aid of a cross pin passing through axially elongated apertures formed in diametrically opposed positions in said inner pipe in the proximity of its upper end so that said actuator sleeve in unloaded condition moves downward under the gravity force to the lowermost position where said cross pin becomes in contact with the upper end face of said spacer sleeve.

In a preferred embodiment of the invention, each of the legs is connected to the base to be pivotally movable about a horizontal axis between a collapsed position substantially parallel to the axial direction of the outer pipe and an extended position extending substantially radially outwardly, and the level adjusting mechanism comprises a hood portion for each of the legs provided on the base and radially extending in the extending direction of the leg to overhang the top surface of the leg and a stopper screw head provided on the top surface of the each leg on the side of its proximal end pivotally connected to the base and adjustable in height in the direction perpendicular to the leg axis and engageable with the inclined lower surface of the hood portion.

In another preferred embodiment of the invention, the support means comprises a stationary sleeve connected with its lower end to the top of the inner pipe by means of screw threads; a torque adjusting bolt extending upward with its upper end beyond the stationary sleeve and having a head engaging a seat provided on the stationary sleeve; a movable head screw-threadedly engaging a threaded portion of the torque adjusting bolt and having a knurl portion and an externally threaded portion for anchoring a holder of an article to be supported; elastic friction engagement means arranged between the stationary sleeve and the movable head and having a bore through which the torque adjusting bolt passes; and a torque fixing nut arranged in a recess formed in the externally threaded portion of the movable head to expose the upper end of the tongue adjusting bolt and screw-threadedly engaging the exposed upper end of the torque adjusting bolt.

With the locking means of the support stand according to the invention different from the clamping means using screw threads of the prior art, when the inner pipe is moved upward relative to the outer pipe by raising the actuator sleeve located at the upper end of the inner pipe, the lower sliding bush of the mesh sleeve means connected to the lower end of the inner pipe slides upwardly along the center bar fixed to the outer pipe. The upward sliding movement of the lower sliding bush causes the radially contracted mesh sleeve to be loosened or radially expanded, while the coil spring causes the upper sliding bush to move upward. When the actuator sleeve is released, the mesh sleeve in this position is axially elongated and radially contracted by the action of the coil spring so as to be in close contact with the center bar to hold this state of the inner and outer pipes.

Next, when the actuator sleeve is moved downward to move the inner pipe downward into the outer pipe, the cross pin of the actuator sleeve moves the upper sliding bush downward with the aid of the spacer sleeve against the action of the coil spring. Therefore, the mesh sleeve radially expands so that the mesh sleeve, the lower sliding bush and the inner pipe move downward along the center bar fixed to the outer pipe. Upon releasing the actuator sleeve, the mesh sleeve is again axially elongated and radially contracted by the action of the coil spring so as to be in close contact with the center bar to stop at this position automatically, thereby holding this condition of the support stand.

According to the support stand of the invention, by adjusting the height of the stopper screw head provided at the upper face of each of the legs on its mounting side to the base, the stopper screw head will engage the inclined lower surface of the hood portion of the base to determine the open angle of the leg before the leg arrives at the fullest extended position. Open angles of the two remaining legs are also determined in the same manner so that the support stand can be vertically settled even the floor is uneven or stepped, as a result of which an article on the support stand is supported in stable condition.

According to the support means of the support stand of the invention, moreover, in order to adjust the sliding engagement strength of the elastic friction engagement means, the axial position of the movable head relative to the torque adjusting bolt is adjusted, and in order to fix the movable head at the adjusted position, the torque fixing nut is connected to the upper end of the torque adjusting bolt by means of screw threads, whereby the torque adjusting bolt, the movable head and the torque fixing nut are integrally united into a head assembly. In this manner the head assembly is rotated in unison relative to the stationary sleeve with a torque in excess of the adjusted torque, thereby holding the article on the support stand in the rotatively adjusted position in the horizontal plane.

The invention will be more fully understood by referring to the following detailed specification and claims taken in connection with the appended drawings.

DESCRIPTION OF THE PREFERRED EMBODIMENTS

Figure 1:
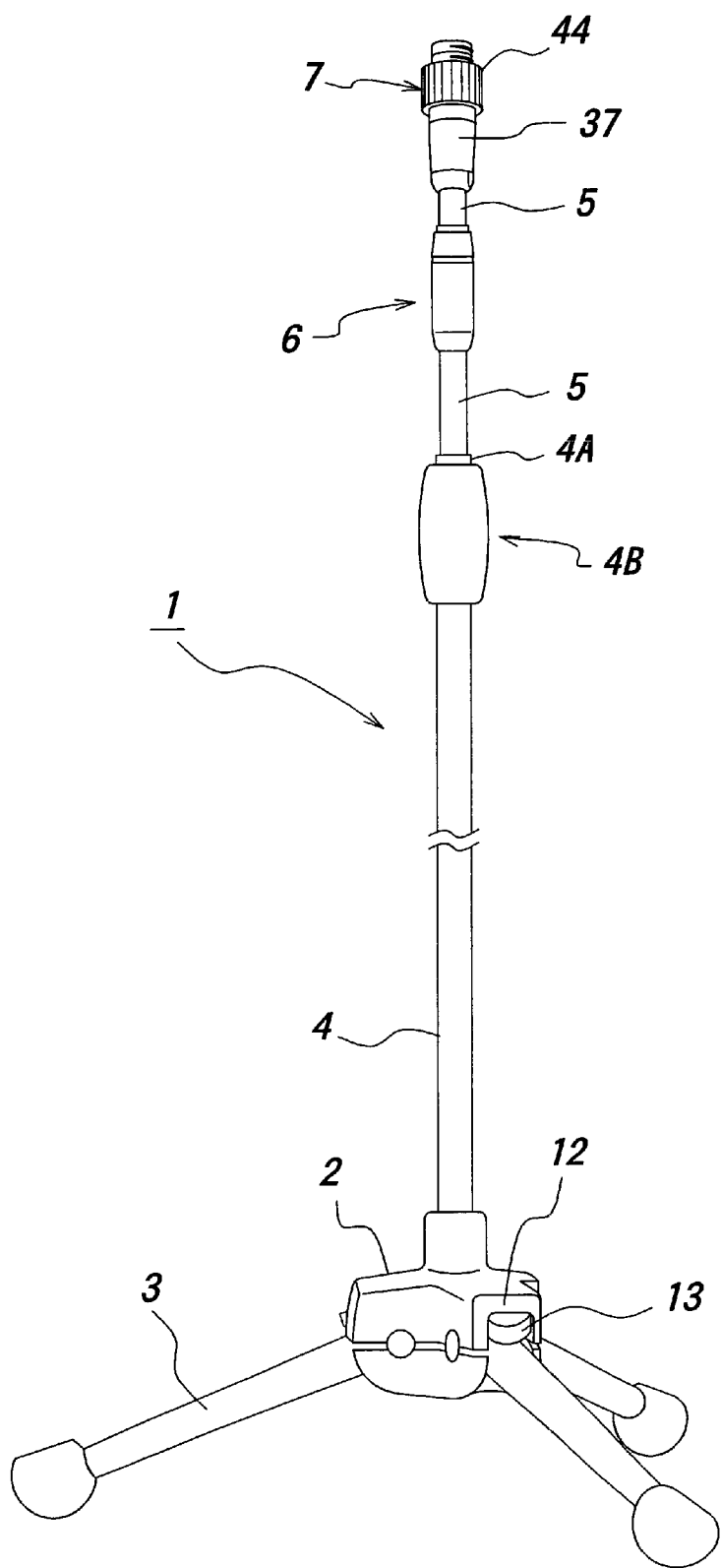
FIG. 1 is a perspective view of a microphone stand as an embodiment of the support stand according to the invention.

FIG. 1 illustrates a microphone stand as a preferred embodiment of the support stand according to the invention. As shown in FIG. 1, the microphone stand 1 comprises a base 2, three legs 3 extending from the base 2 radially outwardly and substantially equiangularly spaced from one another around the base 2, an outer pipe 4 vertically extending from the base 2, an inner pipe 5 telescopically movable in its axial direction in and relative to the outer pipe 4, an actuator sleeve 6 of locking means (later described in detail) for fixing the inner pipe 5 to the outer pipe 4 against the telescopic movement therein, and support means 7 provided on the top of the inner tube 5 for a holder holding a microphone. To the upper end of the outer pipe 4 inside locking areas is fixed stopper and guiding means for providing uppermost and lowermost positions of the inner pipe 5 and for holding the guide tube 4A guiding the inner pipe 5 without play.

Figure 2A:
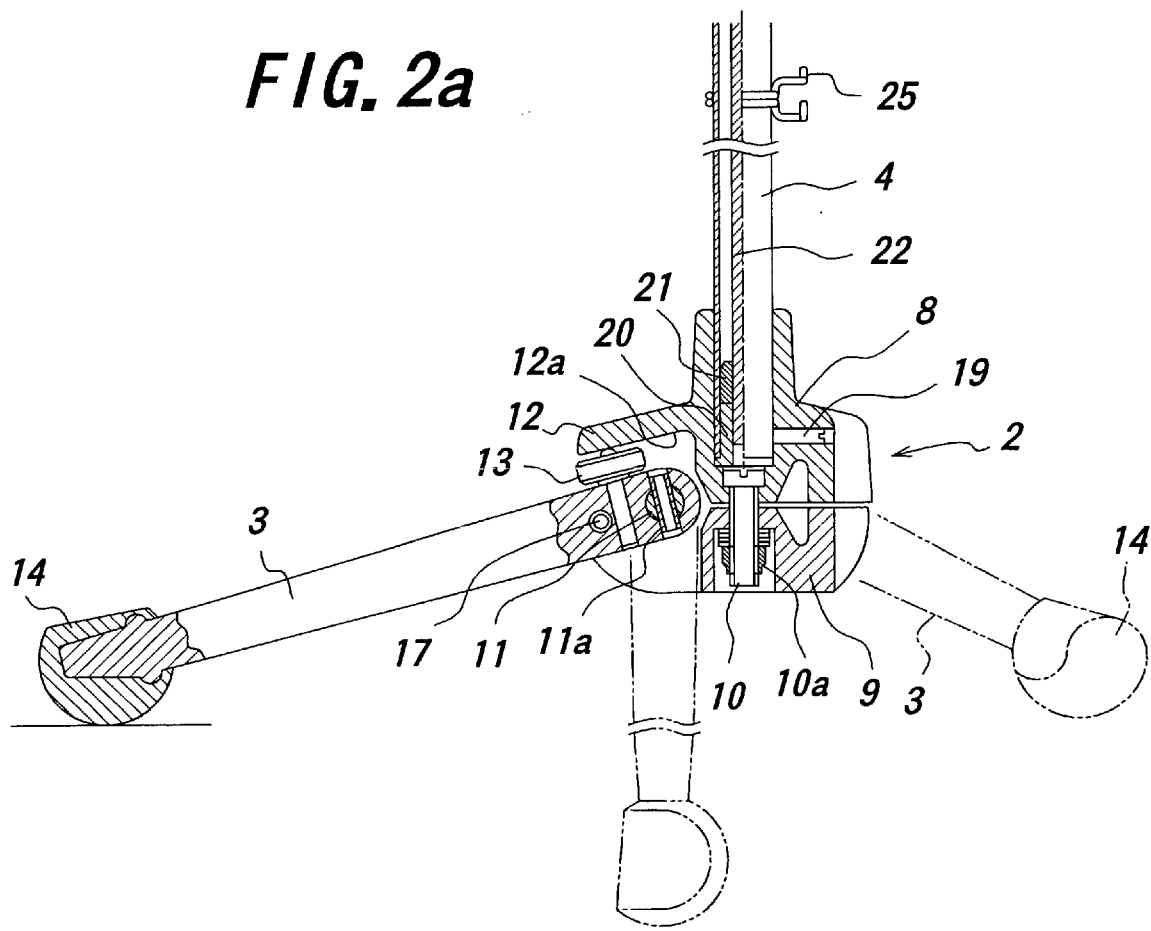
FIG. 2a is a partly sectional side view of the base and a leg of the support stand according to the invention.
Figure 2B:
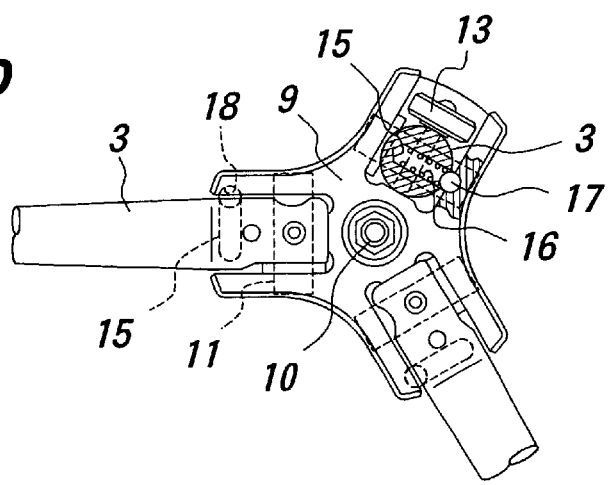
FIG. 2b is an underneath plan view of the base and legs of the support stand according to the invention.
Figure 5A:
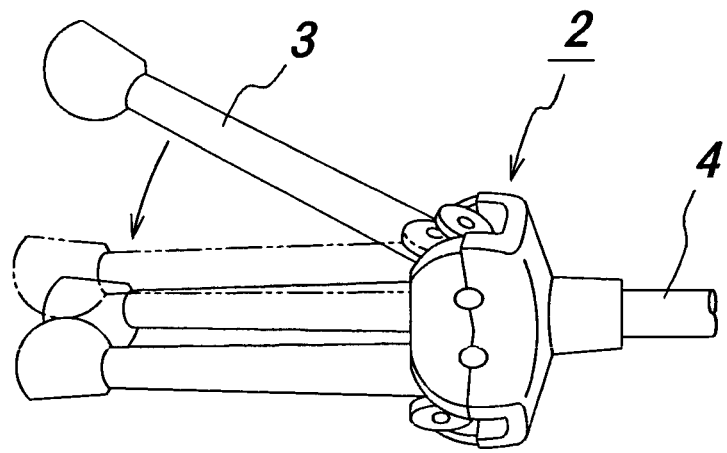
FIG. 5a is an explanatory view illustrating the legs in their collapsed condition of the support stand according to the invention.

In the illustrated embodiment of the invention, the base 2 consists of an upper block 8 for fixing the outer pipe 5 therein, and a lower block 9, these blocks being clamped by means of a bolt 10 and a nut 10a (FIGS. 2a and 2b). Between the upper and lower blocks 9 and 10 are rotatably connected pivot shafts 11 for the respective legs 3. Each of the legs 3 is fixed to the pivot shaft 11 by means of a pin 11a so as to be pivotally movable relative to the base 2 about the horizontal axis of the pivot shaft 11 between a collapsed position substantially parallel to the axial direction of the outer pipe 4 (FIG. 5a) and an extended position extending substantially radially outwardly (FIG. 2a).

The upper block 8 is provided with hood portions 12 radially extending to overhang the upper portions of the legs 3 assumed in their extended positions, respectively. At the proximal end of each of the legs 3 mounted onto the base 2, there is provided a stopper screw head 13 which is adjustable in height relative to the leg 3 and adapted to engage the lower surface 12a of the hood portion 12 facing downward. Each of the legs 3 is further provided at the free end with a buffer pad 14 for protecting a floor surface.

In order to ensure the reliable locking of the leg 3 to the base when the leg 3 is in its extended position to the fullest extent with the stopper screw head 13 being in the minimum height, the leg 3 is formed in its side surface with a cross hole 15 perpendicular to its axis, in which a compression spring 16 is arranged to urge a click ball 17 outwardly into a ball receiving recess 18 formed in the side surface of the hood portion 12.

When the stopper screw head 13 is in its minimum height, the click ball 17 is resiliently fitted or snapped into the ball receiving recess 18 generating a click sound, thereby holding the leg 3 in its fully extended position. When the stopper screw head 13 is rotated to increase its height to any desired extent so that the upper corner of the stopper screw head 13 abuts against the inclined lower surface 12a of the hood portion 12, whereby the leg 3 is held at its intermediately extended position corresponding to the height of the stopper screw head 13.

Figure 5B:
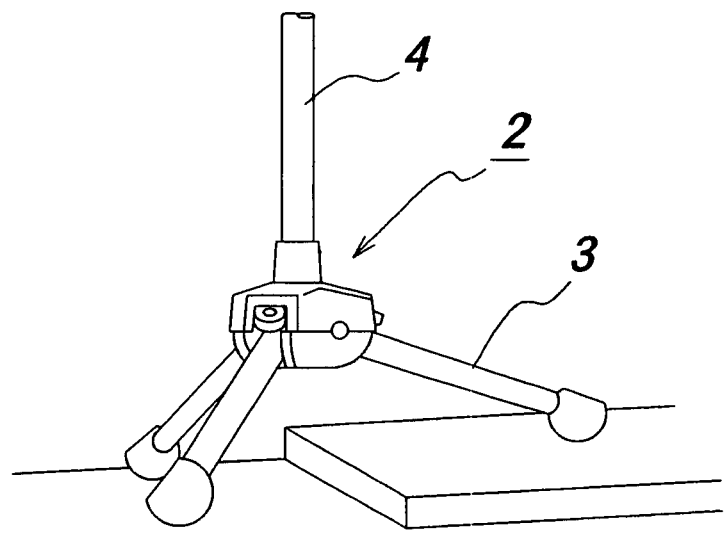
FIG. 5b is an explanatory view illustrating the lower portion of the stand vertically adjusted whose one leg is on a higher part of the floor according to the invention.

With this construction, even if any one of the three legs 3 is located on a surface higher than the other surface or surfaces on which the remaining legs 3 are located, the outer pipe 4 can be always correctly vertically supported as shown in FIG. 5b.

Figure 4:
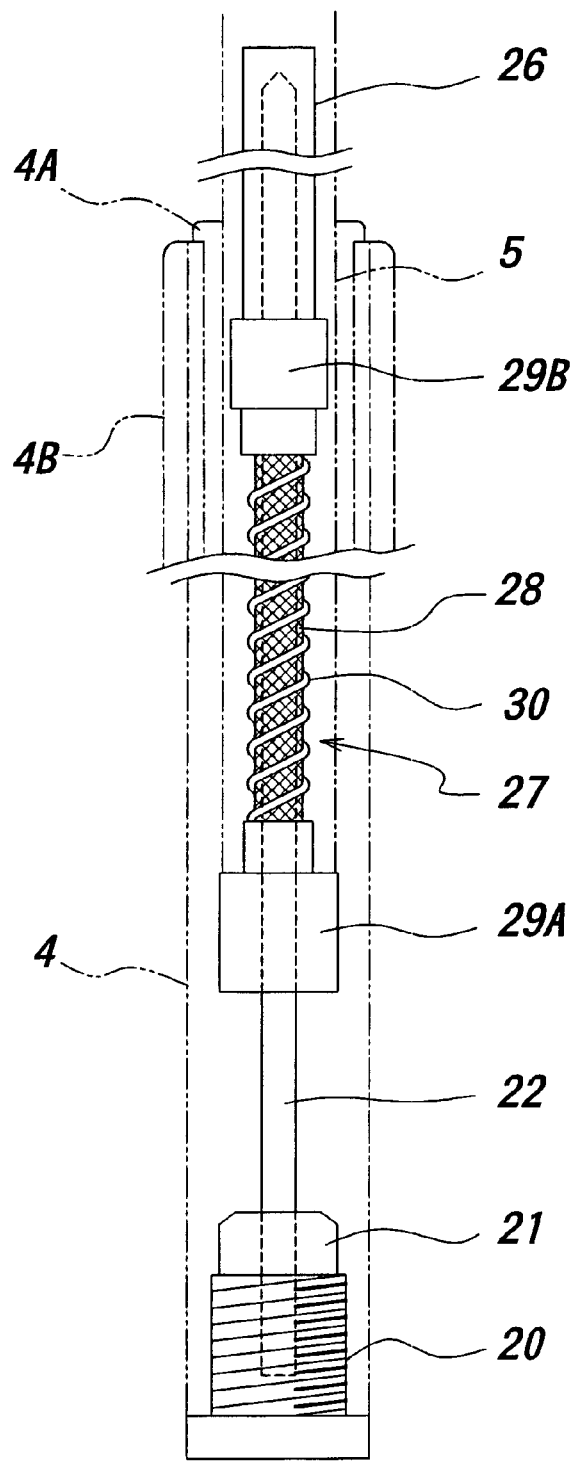
FIG. 4 is a schematic explanatory view illustrating the center bar, mesh sleeve means and spacer sleeve of locking means of the support stand according to the invention.

The outer pipe 4 is fixed to the upper block 8 of the base 2 by means of a set screw 19. A support block 20 for a center bar 22 is fixed to the inside of the lower end of the outer pipe 4 by means of screw threads formed in the support block 20 engaging mating screw threads formed in the internal lower end of the outer pipe 4 as shown in FIG. 4. The center bar 22 is provided with a buffer bush 21 for the inner pipe 5 (not shown in FIG. 2 for the sake of clarity) positioned in its lowermost position in the outer pipe 4. The center shaft 22 may be fixed to the support block 20 by means of any suitable fastening means, for example, screw threads.

It is preferable to provide the outer pipe 4 with a cord holder 25 (FIG. 2a) for hanging a cord extending from a microphone.

Figure 3:
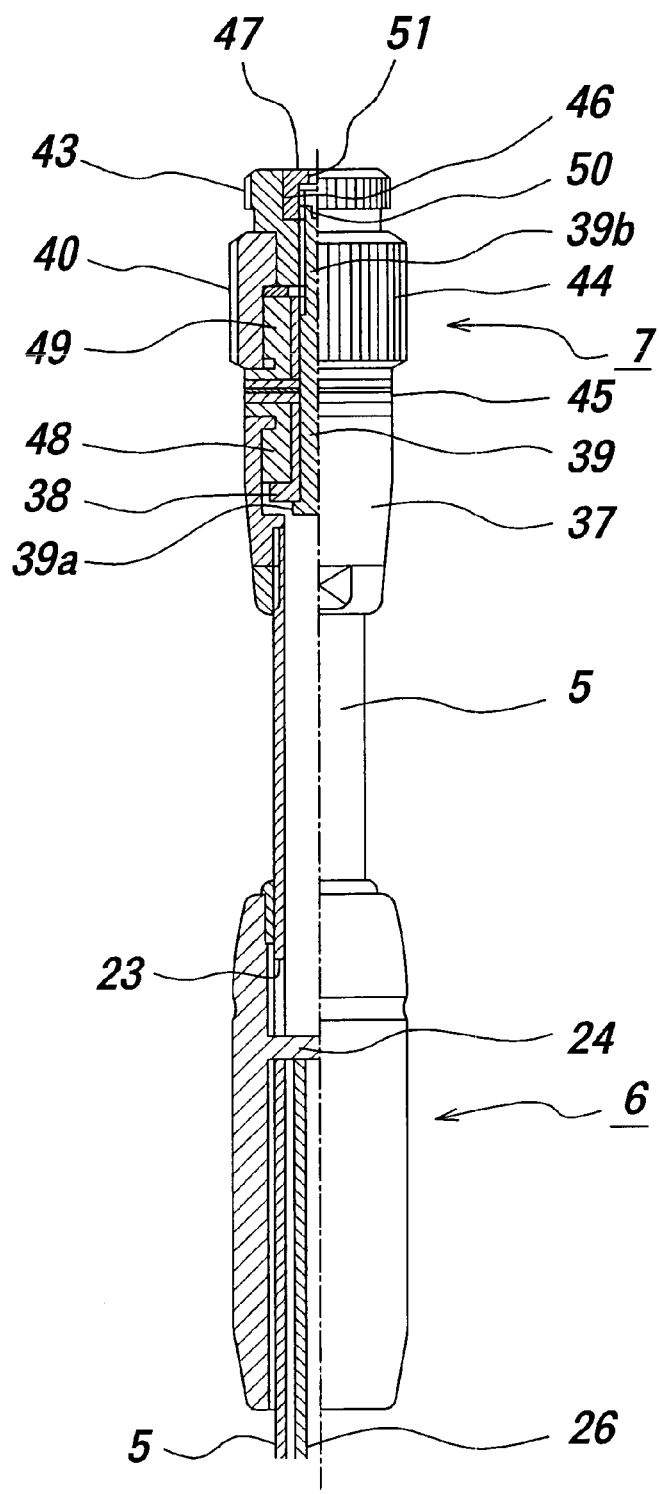
FIG. 3 is a partly sectional side view illustrating the actuator sleeve for locking means and supporting means of the support stand according to the invention.

FIG. 3 illustrates in detail the actuator sleeve 6 provided on the inner pipe 5 in the proximity of its upper end for actuating the locking means for stopping and locking the telescopic movement of the inner pipe 5 in the outer pipe 4, and supporting means 7 mounted on the upper portion of the inner pipe 5 for supporting a holder for holding a microphone.

The actuator sleeve 6 includes a cross pin 24 passing through elongated apertures 23 longer in the axial direction formed in diametrically opposed positions in the inner pipe 5 in the proximity of its upper end, so that the actuator sleeve 6 is axially movable within a limited range relative to the inner pipe 5. In unloaded condition, the actuator sleeve 6 is in the lowermost position under the influence of the gravity force so that the cross pin 24 becomes in contact with the upper end surface of a spacer sleeve 26.

FIG. 4 schematically shows the locking means according to the invention. As shown in FIG. 4, the locking means consists of the center bar 22 fixed through the support block 20 to the lower end of the outer pipe 4, and mesh sleeve means 27.

The mesh sleeve means 27 comprises a mesh sleeve 28 slidably fitted about the center shaft 22, sliding bushes 29A and 29B fixed to lower and upper ends of the mesh sleeve 28, respectively, and a coil spring 30 arranged about the mesh sleeve 28 between the sliding bushes 29A and 29B. The coil spring 30 always urges the lower sliding bush 29A downward and the upper sliding bush 29B upward by means of its spring force, so that the mesh sleeve 28 is axially elongated and radially contracted so as to be brought into close contact with the center bar 22 to grasp it firmly.

The lower sliding bush 29A of the mesh sleeve means 27 is fixed to the lower end of the inner pipe 5. Above the upper sliding bush 29B is arranged the spacer sleeve 26 which is loosely fitted about the center bar 22 with a sufficient clearance therebetween.

With this locking means, by the elongation and contraction of the mesh sleeve 28 whose lower end is normally fixed to the inner pipe 5, the mesh sleeve 28 grasps the center bar 22 fixed to the outer pipe 4 to prevent the movement of the inner pipe 5 relative to the outer pipe 4. When an operator grips the actuator sleeve 6 provided at the upper end of the inner pipe 5 and moves it upward, however, the lower sliding bush 29A moves upward against the spring force of the coil spring 30 so that the mesh sleeve 28, which has been contracted, will radially expand to release the center bar 22, as a result of which the inner pipe 5 together with the mesh sleeve means 27 moves upward along the center bar 22.

When the operator releases the actuator sleeve 6, the mesh sleeve 28 is again axially elongated and radially contracted under the influence of the action of the coil spring 30 so that the mesh sleeve 28 automatically stops at this position so as to prevent the movement of the inner pipe 5 relative to the outer pipe 4. On the other hand, when the operator grips the actuator sleeve 6 and moves it downward to move the inner pipe 5 into the outer pipe 4, the cross pin 24 of the actuator sleeve 6 moves downward the upper sliding bush 29B of the mesh sleeve means 27 with the aid of the spacer sleeve 26 against the spring force of the coil spring 30, so that the mesh sleeve 28 will radially expand to enable the mesh sleeve means 27 and the inner pipe 5 to slide down along the center bar 22.

Thereafter, when the operator releases the actuator sleeve 6, the mesh sleeve 28 is again axially elongated and radially contracted by the action of the coil spring 30 so as to compress the center bar 22 radially inwardly, thereby automatically preventing the inner pipe 5 from moving relative to the center bar 22 and hence the outer pipe 4 in the same manner in the case described above.

Figure 6A:
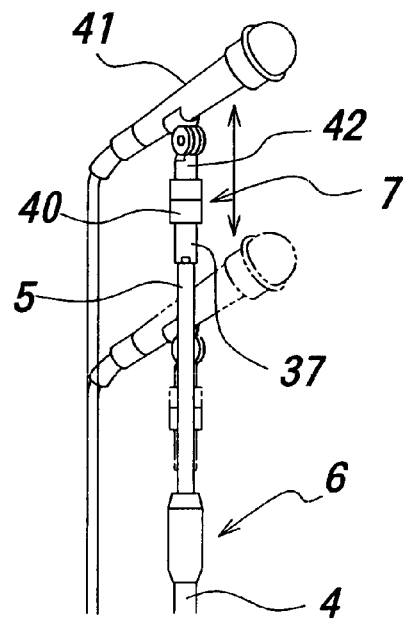
FIG. 6a is an explanatory view illustrating the support stand according to the invention whose height is being adjusted.
Figure 6B:
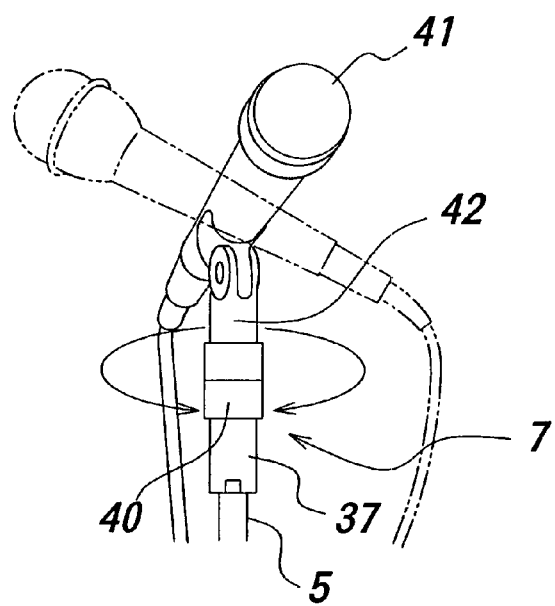
FIG. 6b is an explanatory view illustrating the support stand according to the invention whose angular direction in a horizontal plane is being adjusted.

The support means 7 is able to mount thereon an article to be supported on the top of the inner pipe 5 and includes a mechanism for adjusting angular directions of the article or microphone in a horizontal plane. As shown in FIG. 3, the support means 7 includes a stationary sleeve 37 fixed with its lower end to the upper end of the inner pipe 5 by means of screw threads formed therein, a torque adjusting bolt 39 extending upward with its upper end beyond the stationary sleeve 37 and having a head 39a adapted to engage a seat 38 provided on the stationary sleeve 37, and a movable head 44 threadedly engaging the threaded portion 39b of the torque adjusting bolt 39 and having a knurl portion 40 and an externally threaded portion 43 for anchoring a holder of the article to be supported thereon, i.e. a microphone holder 42 (FIG. 6) for a microphone 41 in the shown embodiment.

The support means 7 is further provided with elastic friction engagement means 45, for example, a plurality of rubber washers and the like, arranged between the stationary sleeve 37 and the movable head 44 and having a bore through which the torque adjusting bolt 39 passes, and a torque fixing nut 47 arranged in a recess 46 formed in the externally threaded portion 43 to expose the upper end of the torque adjusting bolt 39 and adapted to screw-threadedly engage the exposed upper end of the torque adjusting bolt 39.

The seat 38 of the stationary sleeve 37 is preferably a washer having an axial bore secured to the stationary sleeve 37 and arranged at the lower end surface of a rubber vibration isolator 48. It is also preferable to provide the movable head 44 with a rubber vibration isolator 49 having an axial bore.

In the end face on opposite side of the head 39a, the torque adjusting bolt 39 is formed with an aperture 50 for inserting a wrench, for example a hexagon wrench thereinto. The torque fixing nut 47 is also formed in its upper surface with an aperture 51 for inserting a wrench, for example a hexagon wrench thereinto.

According to the support means 7 of the support stand of the invention, in order to adjust the sliding engagement strength (frictional resistance) of the elastic friction engagement means 45, the axial position of the movable head 44 relative to the torque adjusting bolt 39 is adjusted, and in order to fix the movable head 44 at the adjusted axial position, the torque fixing nut 47 is screw-threadedly engaged with the upper end of the torque adjusting bolt 39, whereby the torque adjusting bolt 39, the movable head 44 and the torque fixing nut 47 are integrally united to form a head assembly.

With such an arrangement, when a torque in excess of the set torque is applied to the knurl portion 40, the head assembly is rotated in unison relative to the stationary sleeve 37, thereby holding the article to be supported or the microphone 41 and its holder 42 in the illustrated embodiment in the rotatively adjusted position in the same horizontal plane (FIG. 6b) without requiring once loosening a set screw and then tightening it as in a conventional manner.

It is to be understood that the foregoing description is a preferred embodiment of the invention and that various changes and modifications may be made in the invention without departing from the spirit of the invention or the scope of the claims. For example, the present invention is not limited to the microphone stand but is applicable to various kinds of support stands for supporting various articles in stable condition.

The support stand according to the invention is able to adjust its level (or verticality), height and direction in a horizontal plane in a simple manner and to hold its adjusted position without requiring troublesome and time-consuming operations of once loosening set screws and, after required adjustment, again tightening the set screws as in the conventional manner.

What is claimed is:

1. A support stand including:

a base;

three legs secured to said base to extend radially therefrom and substantially equiangularly spaced from one another around said base and having a level adjusting mechanism;

an outer pipe vertically extending from said base;

an inner pipe telescopically movable in its axial direction relative to said outer pipe for adjusting the height of said support stand;

locking means for locking said inner pipe against its telescopic movement relative to said outer pipe; and support means enabling the top of said inner pipe to mount thereon an article to be supported and having a mechanism for adjusting directions of said article in a horizontal plane, wherein said locking means comprises:

a center bar concentrically arranged in said outer pipe and its lower end fixed to the lower end of said outer pipe;

mesh sleeve means including a mesh sleeve slidably fitted about said center bar, upper and lower sliding bushes connected to upper and lower ends of said mesh sleeve, respectively, a coil spring arranged about said mesh sleeve between said upper and lower sliding bushes so that said mesh sleeve is axially elongated and radially contracted by the spring action of said coil spring to grasp said center bar by means of the mesh sleeve which is contracted and in close contact with said center bar, said lower sliding bush being fixed to the lower end of said inner pipe;

a spacer sleeve arranged above said upper sliding bush and loosely fitted on said center bar and in said inner pipe; and an actuator sleeve provided around said inner pipe in the proximity of its upper end and connected to said inner pipe in a manner axially movable within a limited range with the aid of a cross pin passing through axially elongated apertures formed in diametrically opposed positions in said inner pipe in the proximity of its upper end so that said actuator sleeve in unloaded condition moves downward under the gravity force to the lowermost position where said cross pin comes in contact with an upper end face of said spacer sleeve.

2. The support stand as set forth in claim 1, wherein each of said legs is connected to said base to be pivotally movable about a horizontal axis between a collapsed position substantially parallel to the axial direction of said outer pipe and an extended position extending substantially radially outwardly, and said level adjusting mechanism comprises a hood portion for each of said legs provided on said base and radially extending in the extending direction of the leg to overhang the top surface of the leg, and a stopper screw head provided on the top surface of the each leg on the side of its proximal end pivotally connected to the base and adjustable in height in the direction perpendicular to the leg axis and engageable with the inclined lower surface of said hood portion.

3. The support stand as set forth in claim 2, wherein each of said legs is provided on its side surface with a click ball radially outwardly loaded by a spring, and each of said hood portions has formed in its side surface with a ball receiving recess for receiving said click ball when the leg is in the fully radially extended position with the stopper screw head being minimum in height in order to ensure the locking of the leg in the fully extended position to said base.

4. The support stand as set forth in claim 1, wherein said support means comprises:

a stationary sleeve connected with its lower end to said top of said inner pipe by means of screw threads;

a torque adjusting bolt extending upward with its upper end beyond said stationary sleeve and having a head engaging a seat provided on said stationary sleeve;

a movable head screw-threadedly engaging a threaded portion of said torque adjusting bolt and having a knurl portion and an externally threaded portion for anchoring a holder of an article to be supported;

elastic friction engagement means arranged between said stationary sleeve and said movable head and having a bore through which said torque adjusting bolt passes; and a torque fixing nut arranged in a recess formed in said externally threaded portion of said moveable head to expose the upper end of said torque adjusting bolt and screw-threadedly engaging the exposed upper end of said torque adjusting bolt.

5. The support stand as set forth in claim 1, wherein said article to be supported is a microphone.

6. The support stand as set forth in claim 2, wherein said support means comprises:

a stationary sleeve connected with its lower end to said top of said inner pipe by means of screw threads;

a torque adjusting bolt extending upward with its upper end beyond said stationary sleeve and having a head engaging a seat provided on said stationary sleeve;

a movable head screw-threadedly engaging a threaded portion of said torque adjusting bolt and having a knurl portion and an externally threaded portion for anchoring a holder of an article to be supported;

elastic friction engagement means arranged between said stationary sleeve and said movable head and having a bore through which said torque adjusting bolt passes; and a torque fixing nut arranged in a recess formed in said externally threaded portion of said moveable head to expose the upper end of said torque adjusting bolt and screw-threadedly engaging the exposed upper end of said torque adjusting bolt.

7. The support stand as set forth in claim 3, wherein said support means comprises:

a stationary sleeve connected with its lower end to said top of said inner pipe by means of screw threads;

a torque adjusting bolt extending upward with its upper end beyond said stationary sleeve and having a head engaging a seat provided on said stationary sleeve;

a movable head screw-threadedly engaging a threaded portion of said torque adjusting bolt and having a knurl portion and an externally threaded portion for anchoring a holder of an article to be supported;

elastic friction engagement means arranged between said stationary sleeve and said movable head and having a bore through which said torque adjusting bolt passes; and a torque fixing nut arranged in a recess formed in said externally threaded portion of said moveable head to expose the upper end of said torque adjusting bolt and screw-threadedly engaging the exposed upper end of said torque adjusting bolt.

8. The support stand as set forth in claim 2, wherein said article to be supported is a microphone.

9. The support stand as set forth in claim 3, wherein said article to be supported is a microphone.

10. The support stand as set forth in claim 4, wherein said article to be supported is a microphone.

* * * * *